US010630571B1

(12) United States Patent
Brooker

(10) Patent No.: US 10,630,571 B1
(45) Date of Patent: Apr. 21, 2020

(54) FAULT-TOLERANT REQUEST ROUTING

(71) Applicant: Amazon Technologies, Inc., Seattle, WA (US)

(72) Inventor: Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 15/815,664

(22) Filed: Nov. 16, 2017

(51) Int. Cl.
| | |
|---|---|
| *H04L 12/755* | (2013.01) |
| *H04L 12/741* | (2013.01) |
| *H04L 12/707* | (2013.01) |
| *H04L 12/703* | (2013.01) |
| *H04L 12/24* | (2006.01) |

(52) U.S. Cl.
CPC ............ *H04L 45/021* (2013.01); *H04L 45/22* (2013.01); *H04L 45/28* (2013.01); *H04L 45/54* (2013.01); *H04L 41/0654* (2013.01)

(58) Field of Classification Search
None
See application file for complete search history.

(56) References Cited

U.S. PATENT DOCUMENTS

| | | | |
|---|---|---|---|
| 6,370,584 B1 | 4/2002 | Bestavros et al. | |
| 6,768,740 B1 * | 7/2004 | Perlman | H04L 45/02 370/238 |
| 7,031,321 B2 * | 4/2006 | Habetha | H04L 45/028 370/252 |
| 7,127,514 B2 | 10/2006 | Hunt | |
| 7,606,252 B2 | 10/2009 | Man-Hak Tso et al. | |
| 7,783,763 B2 | 8/2010 | Tuel | |
| 7,937,436 B2 | 5/2011 | Matthews et al. | |
| 8,134,916 B2 | 3/2012 | Achiloptas et al. | |
| 8,539,197 B1 | 9/2013 | Marshall et al. | |
| 8,850,002 B1 | 9/2014 | Dickinson et al. | |
| 8,935,493 B1 | 1/2015 | Dolan et al. | |
| 9,497,123 B2 | 11/2016 | Basavaraja et al. | |
| 2003/0079027 A1 | 4/2003 | Slocombe et al. | |

(Continued)

OTHER PUBLICATIONS

U.S. Appl. No. 14/638,821, filed Mar. 4, 2015, Joseph E. Magerramov et al.

(Continued)

*Primary Examiner* — Jeffrey M Rutkowski
*Assistant Examiner* — Andre Tacdiran
(74) *Attorney, Agent, or Firm* — Robert C. Kowert; Kowert, Hood, Munyon, Rankin & Goetzel, P.C.

(57) ABSTRACT

Fault-tolerant request routing routes request to service hosts without using a central routing authority to processes each request and without applying a consensus protocol to each request. In order to route requests, a routing authority distributes updated routing tables to request routers or clients while the request routers or clients continue to route requests according to a previous version of the routing table. Each request router or client includes a logical clock and refrains from using the next version of the routing table until receiving an indication to transition its logical clock. The routing authority indicates to a first request router to transition its logical clock to the next moment in logical time and an epidemic algorithm transitions other ones of the request router to the next moment in logical time without direct involvement by the routing authority.

20 Claims, 11 Drawing Sheets

(56) References Cited

U.S. PATENT DOCUMENTS

| | | | |
|---|---|---|---|
| 2006/0126611 A1* | 6/2006 | Kelly | H04L 29/12283 |
| | | | 370/389 |
| 2007/0022121 A1 | 1/2007 | Bahar et al. | |
| 2009/0144284 A1 | 6/2009 | Chatley et al. | |
| 2011/0261697 A1* | 10/2011 | Crisan | H04L 12/4641 |
| | | | 370/235 |
| 2012/0113867 A1* | 5/2012 | Georgel | H04L 45/26 |
| | | | 370/255 |
| 2012/0233522 A1 | 9/2012 | Barton et al. | |
| 2013/0138834 A1* | 5/2013 | Imamura | G06F 9/5088 |
| | | | 709/242 |
| 2014/0297888 A1 | 10/2014 | McCann | |
| 2016/0323286 A1* | 11/2016 | Hoover | G06F 21/6218 |
| 2017/0208002 A1* | 7/2017 | Bittles | H04L 45/72 |
| 2018/0367441 A1* | 12/2018 | Liu | H04L 69/18 |

OTHER PUBLICATIONS

U.S. Appl. No. 14/290,680, filed May 29, 2014, Marwan Salah El-Din Oweis et al.
U.S. Appl. No. 15/714,826, filed Sep. 25, 2017, Pracheer Gupta et al.

* cited by examiner

602

| Client A | Resource Cell 3 |
|---|---|
| Client B | Resource Cell 1 |
| Client C | Resource Cell 2 |
| ⋮ | ⋮ |

Example Client - Based Routing Table

| Database Service | Resource Cell 1 |
|---|---|
| Key-Based Storage Service | Resource Cell 3 |
| Compute Service | Resource Cell 2 |
| ⋮ | ⋮ |

Example Service - Based Routing Table

| Resource Cell 1 | Keys 1-50 |
|---|---|
| Resource Cell 2 | Keys 51-100 |
| Resource Cell 3 | Keys 101-150 |
| ⋮ | ⋮ |

Example Key - Based Routing Table

FIG. 6C

FAULT-TOLERANT REQUEST ROUTING

BACKGROUND

Distributed systems have created great opportunities for implementing more efficient and available system architectures. Systems may no longer be limited by the capabilities of an individual computing system, but may instead share the workload for performing complex computing tasks, maintaining and storing data, or implementing various applications or services among multiple different computing systems. For example, in some distributed systems data may be maintained among a collection of different systems in order to provide greater reliability and availability in the face of individual system failures.

The ability to leverage the capabilities of multiple different systems, however, can increase the complexity of ensuring that common data or other information maintained or shared among multiple systems is consistent and accessible to clients. If, for example, related or common data is maintained in different locations, a change to the location of data from one storage location to another may precipitate operations to make the various request routing systems that provide access to the data aware of the change in location. In order to do this, some distributed systems maintain routing instructions in a centralized authority wherein request routers of the distributed system consult the centralized authority for routing instructions in order to route each request received. Such systems provide high levels of routing consistency, but are susceptible to far reaching failures, such as system-wide failures, if the centralized authority fails or cannot be reached by the request routers.

Other distributed systems may distribute routing instructions among multiple request routers in order to avoid a single-point failure causing far reaching failures, such as system-wide failures. However, in order to provide consistent routing of requests among the multiple request routers, such systems may employ a consensus protocol. For example, a consensus protocol may require a consensus to be reached among a quorum of request routers in order to determine a route to be applied for routing each received request. In such systems, achieving consensus for each request may add latency to the processing of the requests. Also, achieving consensus may become complex in larger systems or as a scale of an existing system is increased.

In addition, distributed systems may allocate compute resources to clients of the distributed system, wherein the compute resources are allocated from among multiple separate computing systems. Such distributed systems may also employ a centralized routing authority or a consensus protocol to manage request routing. Such systems may also be susceptible to far reaching failures, such as system-wide failures, if a centralized routing authority fails or cannot be reached by the request routers. Also, use of a consensus protocol in such systems may increase request response latencies and become complex in large or expanding systems.

BRIEF DESCRIPTION OF THE DRAWINGS

FIGS. 6A-6C illustrate simplified example routing tables used in a fault-tolerant request routing system, according to some embodiments.

Figure 1:
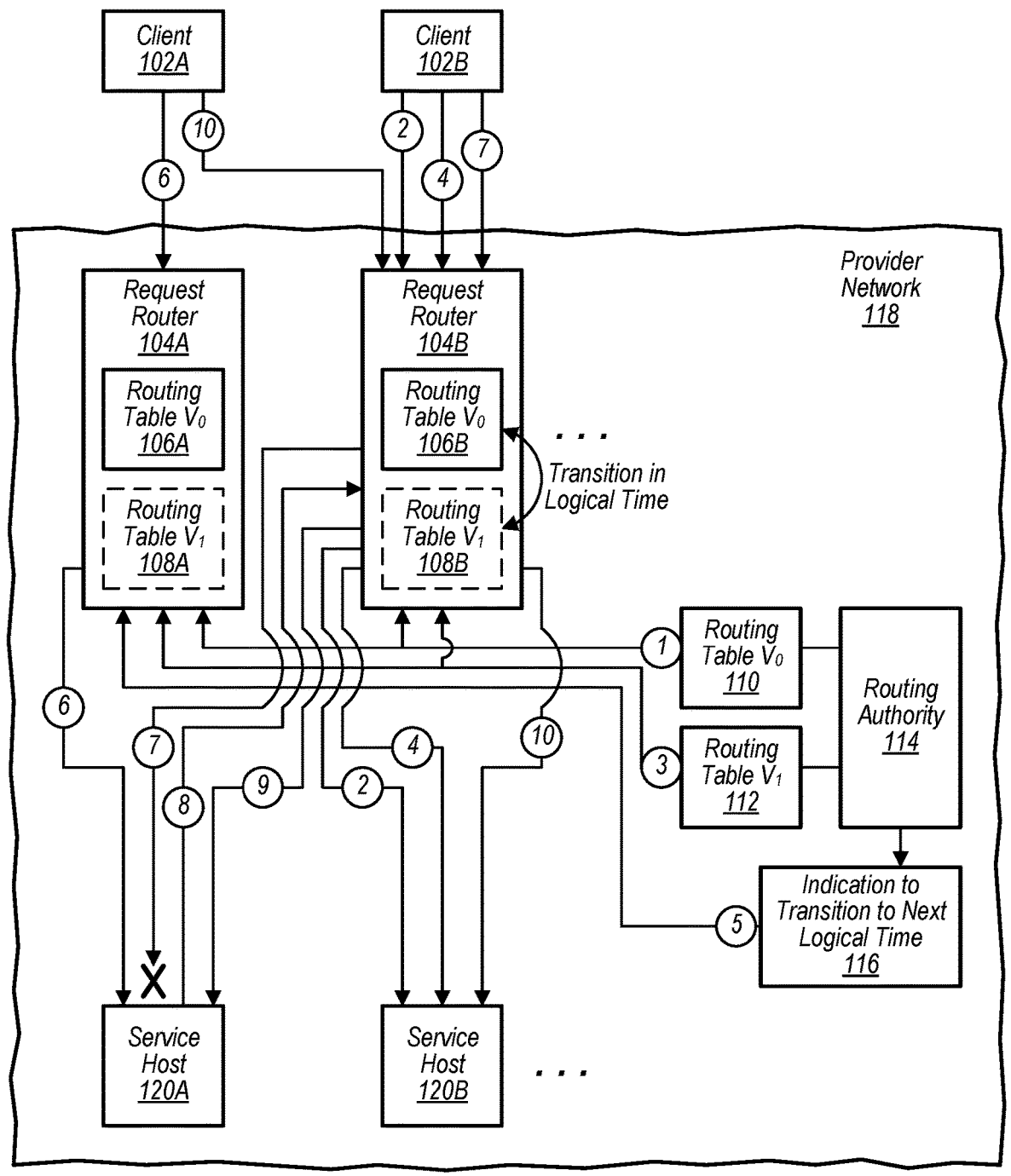
FIG. 1 is a block diagram illustrating interactions between request routers, a routing authority, and service hosts in a fault-tolerant request routing system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. The circuitry that forms the structure corresponding to "configured to" may include hardware circuits. In some contexts, the structure may be implemented as part of a general purpose computing device that is programmed to perform the task or tasks according to programming instructions.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of a fault-tolerant request routing system are described herein. According to some embodiments, a fault-tolerant routing system is implemented in a provider network that includes a plurality of request routers each configured to receive request packets from one or more clients of the provider network, a plurality of service hosts each configured to process the request packets from the one or more clients of the provider network, and a routing authority configured to generate, for each of a plurality of moments in logical time, a corresponding routing table comprising routing instructions for routing packets between respective ones the request routers and respective ones of the service hosts. Each of the request routers is configured to route respective packets to respective ones of two or more of the service hosts, according to a current version of the routing table corresponding to a current moment in logical time from the perspective of the request router and indicate in the respective routed packets the current moment in logical time from the perspective of the request router. Each of the request routers is also configured to receive from the routing authority another version of the routing table corresponding to a next moment in logical time, but continue to route additional respective request packets to respective ones of the two or more of the service hosts, according to the version of the routing table for the current moment in time from the perspective of the request router, and in response to receiving the indication, route subsequently received packets according to the other version of the routing table, wherein the packets routed according to the other version of the routing table indicate the next moment in logical time as the current moment in logical time from the perspective of the request router. Also, each of the service hosts is configured to maintain a record of a latest moment in logical time indicated in a packet received from any of the request routers and in response to receiving a packet from one of the request routers that indicates a moment in logical time previous to the latest moment in logical time in the record maintained by the service host, send a response to the request router comprising an indication to transition to the next moment in logical time. In some embodiments, the functionality of the request router may be implemented outside of the provider network, for example on a client device. In some embodiments, a client device may download fault-tolerant request routing software from the provider network in order to implement the functionality of a request router as described herein on a client device. In other embodiments, the functionality of the request router is implemented on a router of the provider network.

According to some embodiments, a method includes routing respective packets to respective ones of two or more service hosts of a provider network, according to a locally stored current version of a routing table corresponding to a current moment in logical time, wherein the respective routed packets indicate a first moment in logical time as the current moment in logical time. The method further includes receiving from a routing authority of the provider network another version of the routing table corresponding to a next moment in logical time, but continuing to route additional respective packets to respective ones of the two or more service hosts, according to the version of the routing table corresponding to the first moment in logical time. The method also includes receiving an indication to transition to the next moment in logical time and, in response to receiving the indication, routing subsequent packets according to the other version of the routing table, wherein the subsequent packets routed according to the other version of the routing table indicate the next moment in logical time as the current moment in logical time.

According to some embodiments, a non-transitory computer readable medium stores program instructions, that when executed by one or more processors, cause the one or more processors to route respective packets to respective ones of two or more service hosts of a provider network, according to a current version of a routing table corresponding to a current moment in logical time, wherein the respective routed packets indicate a first moment in logical time as the current moment in logical time; receive from a routing authority of the provider network another version of the routing table corresponding to a next moment in logical time; continue to route additional respective request packets to respective ones of the two or more service hosts, according to the version of the routing table corresponding to the current moment in logical time; receive an indication to transition to the next moment in logical time; and in response to receiving the indication, route subsequent packets according to the other version of the routing table, wherein the packets routed according to the other version of the routing table indicate the next moment in logical time as the current moment in logical time.

Some distributed systems include a central routing authority that maintains a single authoritative routing table or a single set of authoritative routing tables. In such systems, each time a request is to be routed within the distributed system, the central routing authority is consulted to determine how to route the request. For example, the routing table may include a table comprising different parameters that may be associated with a request and corresponding service hosts that are to receive requests having particular ones of the parameters. However, in such systems, a failure or loss of communication with the central routing authority may prevent multiple or all of the request routers of the distributed system from routing requests while the central routing authority is unavailable. Also, such systems may be limited in scale. For example, as more request routers and service hosts are added to the system, a capacity of a central routing authority to provide routing instructions for each request received by the system may be insufficient. Such systems may be considered to have strong routing information consistency because a single central routing authority maintains the routing tables. However, as discussed above, such systems may be susceptible to large blast radius failures.

Other distributed systems may distribute replicas of routing tables to multiple entities, such as request routers, and use a consensus protocol, such as a PAXOS protocol, to ensure consistency of the routing information. However, such systems may require expensive coordination on each request, thus imposing a substantial latency penalty on processing of requests. Also, coordination may limit scalability. For example, as more request routers and service hosts are added to a distributed system coordinating between a large number of request routers to process each request may become inhibitive.

Additionally, some other systems may utilize an "eventually consistent" approach to updating routing table information. However, in such systems customer experience may be negatively impacted because customers may receive error messages or incorrect routing of requests until the system has reached consistency.

In some embodiments, a fault-tolerant request routing system, as described herein, may provide consistent request routing from the perspective of a client of a distributed system without consulting a central routing authority to process each request and without requiring a consensus to be reached among multiple entities in order to process each request. Thus, a blast radius due to a single-point failure may be reduced as compared to systems that rely on a central routing authority to provide routing information for each request. Additionally, added latency required to reach consensus between multiple entities in order to process a request may be omitted. Also, a fault-tolerant request routing system may relax consistency constrains for routing information as viewed internally as compared to a PAXOS type consensus protocol. For example, a fault-tolerant request routing system may allow for some variations in routing table information across request routers while transitioning between versions of a routing table. However, these inconsistencies may not be exposed to clients and the fault-tolerant request routing system may provide the appearance of consistency to clients interacting with the request routers. Thus, a fault-tolerant request routing system may improve durability without imposing the substantial latency penalty required when using a consensus protocol, such as a PAXOS protocol or other consensus protocol, while not exposing inconsistencies in routing information to clients.

In some embodiments, in order to improve durability without adding latency to request processing or exposing a client to inconsistent routing, a fault-tolerant request routing system or service may utilize a logical clock and an epidemic algorithm to transition between versions of a routing table. New versions of a routing table may be distributed to request routers using an eventually consistent approach. However a transition in logical time that causes the new versions of the routing table to be used to route requests may be strongly consistent via use of an epidemic algorithm to indicate the transition in logical time to the request routers.

For example, a routing authority may generate a new version of a routing table for each new moment in logical time. The routing authority in conjunction with other components of a distributed system may distribute or provide the new version of the routing table to request routers of the system while the request routers continue to route requests according to a previous version of the routing table that corresponds to a current moment in logical time from the perspective of the request routers. Once the new version of the routing table has been distributed to the request routers, one of the request routers may transition its logical clock to the next moment in logical time and begin using the newer version of the routing table that now corresponds to the request router's current logical time from the perspective of the request router.

In addition, the request router may indicate in each routed request the request router's current logical time. Thus, any service host receiving requests from the transitioned request router will receive an indication of the transition to the next moment in logical time.

Also, each service host may maintain a record of the latest moment in logical time that has been indicated by any of the request routers with which the service host has interacted. Additionally, each service host may compare a logical time indicated in a request received from one of the request routers to the record indicating the latest logical time the service host has seen. If a request is received from a request router indicating a moment in logical time that precedes the latest moment in logical time the service host has seen (e.g. a previous moment in logical time), the service host may reject the request and send a response indicating that the request router is to transition to the next moment in logical time.

In response to receiving an indication to transition to the next moment in logical time from a service host (or from the routing authority), a request router may transition its logical clock to the next moment in logical time. The request router may also begin to use the next version of the routing table corresponding to the new current moment in logical time to route subsequently received requests. The request router may also indicate in the subsequently routed requests the new current logical time. Thus, other service hosts with which the request router communicates will also be transitioned to record the next moment in logical time as the latest moment in logical time. Likewise, any of the request routers interacting with one of the service hosts that has recorded the next moment in logical time will also be transitioned to the next moment in logical time.

As can be seen, once the request routers have received a next version of a routing table, the transition to using the next routing table to route packets spreads through the fault-tolerant request routing system like an epidemic wherein request routers and service hosts infects respective request routers and service hosts with which they interact. However in contrast to previous systems, the transition from one router table version to another router table version progresses independently from the routing authority (after the most recent version of the routing table is distributed to the request routers from the routing authority). Also, each request router processes requests based on its locally stored copy of the current version of the routing table corresponding to the current moment in logical time from the perspective of the request router without consulting the routing authority in order to process each request. In addition, a consensus protocol is not executed in order to process each request.

Additionally, in some embodiments, new routing table versions received by request routers but not yet in use may be tested, for example for data corruption during distribution, before the fault-tolerant system transitions to using the new routing table version to route requests.

While, in some embodiments, there may be some inconsistencies in routing information currently in use across the request routers of a fault-tolerant routing system, the inconsistencies are not visible to clients. For example, during the transition process between one moment in logical time to the next moment in logical time, one request router may be using a newer version of the routing table than another request router that has not yet transitioned its logical clock. However, such inconsistencies may be corrected by a service host rejecting a request indicating an out of date moment in logical time and sending an indication to the request router to transition to the next moment in logical time. Thus, only a single extra request may be incurred between the request router and the service host (re-sending the rejected request) in order to resolve the inconsistency. Also, this additional request may be done between the request router and the service host without the client device being aware that the request was rejected and re-sent according to the newer version of the routing table.

For example, a client may have data stored on a first service host that receives requests routed from a first request router. The client's data may be moved to a second service host and an updated routing table may indicate that the data is stored in the second service host. A marker may be stored at the second service host indicating that the data has been moved to the first service host. When the first request router attempts to access the data at the first service host it may be re-directed to the second service host, which may then indicate to the request router to transition its logical clock. For example another request router may have already interacted with the second service host causing it to record the next moment in logical time as the latest moment in logical time. However, the re-direction to the second service host and the rejection of the out of date request indicating a previous moment in logical time may take place behind the request routers and hidden from the client device, thus hiding any inconsistencies in routing information from the client.

In some embodiments, a fault-tolerant routing system may manage routing of requests within a provider network. The provider network may provide services to clients of the provider network, such as data storage services, data analysis services, compute services, networking services, etc. The clients of the provider network may submit requests directed to one or more services offered by the provider network to an application program interface of the provider network. In some embodiments, the API may be implemented at one or more of the request routers of the provider network. Routing information included in a currently in use version of a routing table stored at the request router may indicate which service host of the provider network a request is to receive the request based on one or more characteristics of the request. For example, the request may indicate an identity of the client, such as an account number of the client, and the routing table may store routing information that indicates a service host on which that client's data is stored. As another example, a particular service may be implemented on a particular service host or set of service hosts and a request received at a request router may indicate to which service of the provider network the request is directed. Also, the request router may store routing information in a most current version of the routing table that indicates request directed to the particular service are to be routed to a particular set of one or more service hosts. In some embodiments, other characteristics of a request may be used to determine how to route the request based on routing information stored in a most current version of a routing table stored locally at a request router. Also, as discussed in more detail below in regard to FIG. 4, in some embodiments, the functionality of a request router as described herein may be implemented on a client device. For example a client device may download or otherwise access program instructions for implementing "request routing" on the client device and send requests directly to service hosts.

FIG. 1 is a block diagram illustrating interactions between request routers, a routing authority, and service hosts in a fault-tolerant request routing system, according to some embodiments.

Provider network 118 includes request routers 104A, 104B, and may include additional request routers. Provider network 118 also includes service hosts 120A, 120B, and may include additional service hosts. Also, provider network 118 includes a routing authority 114. In some embodiments, a routing authority generates new versions of a routing table. For example, the routing authority may generate new versions of a routing table in order to balance loads. Also, for example, the routing authority may generate new versions of a routing table to include new clients of the provider network, to correct for clients that have discontinued to use services of the provider network, to add new services to the provider network, to account for expansion of the provider network, for example by adding more service hosts and/or request routers to the provider network, or for various other changes in the provider network that may impact routing of requests within the provider network.

In some embodiments, new versions of a routing table may be generated at a set frequency, for example every second, 10 seconds, 30 seconds, 1 minute, etc. In some embodiments, new versions of a routing table may be generated in response to changes necessitating an updated routing table and may not be generated until a change in the provider network necessitates a new version of the routing table be generated. In some embodiments, exceeding a threshold number or impact of changes may cause a new version of a routing table to be generated. In some embodiments, other provider network systems, such as load balancers may determine changes that are to be made to routing instructions and a routing authority may generate a new version of a routing table based on changes determined by other components or systems of the provider network. In some embodiments, a routing authority may make such determinations.

FIG. 1 also illustrates clients 102A and 102B that are sending requests to the provider network. In some embodiments a fault-tolerant routing system may receive requests from more or fewer clients. For example, clients 102A may be providing data to be stored in a storage service of the provider network, requesting data stored for the clients from the provider network, requesting compute operation to be executed on behalf of the clients, or may be requesting various other services offered by the provider network. For the sake of clarity, in FIG. 1 only the routing of the requests to the service hosts from the clients 102A and 102B are illustrated. However, in some embodiments the request may provoke a response that may also be routed back to the clients in a reverse direction as the requests were routed.

In order to illustrate a sequence of events that occur as updated versions of a routing table are provided to request routers and as the request routers transition to using the updated versions of the routing table, FIG. 1 illustrates a sequence of events 1-10.

At event 1, an initial version of the routing table, routing table version $V_0$ 110, is provided to request routers 104 A/B and is stored in the request routers as routing table version $V_0$ 106A and routing table version $V_0$ 106B, respectively. In some embodiments, a routing authority, such as routing authority 114, may distribute the routing table to the request routers. Also, in some embodiments request routers, such as request routers 104A and 104B, may initiate distribution of the routing table by requesting the routing table from the routing authority, such as routing authority 114. In some embodiments, distribution of a routing table or a latest version of a routing table may be performed asynchronously. Thus, request routers, such as request routers 104A and 104B may request or be distributed a routing table or a latest version of the routing table at slightly different times. This may reduce an overhead load on a routing authority and network of a provider network to distribute routing tables or updated routing table versions. For example, a routing table may be provided to request router 104A, and subsequently provided to request router 104B.

At event 2, a request is routed from client 102B to request router 104B. A logical clock of request router 104B indicates a logical time from the perspective of the request router 104B to be the initial moment in logical time corresponding with routing table $V_0$. Thus, request router 104B uses the locally stored routing table $V_0$ 106B to route the request received at event 2 to service host 120B for processing of the request. Also, the routed request indicates that the current moment in logical time from the perspective of request router 104B is the initial moment in logical time (e.g. the moment in logical time corresponding to routing table version $V_0$). Thus, service host 120B records the latest moment in logical time seen by the service host as the initial moment in logical time.

At event 3, a new version of the routing table, routing table $V_1$ 112, is generated by routing authority 114 and provided to request routers 104A and 104B. The new version of the routing table is stored at request router 104A as routing table $V_1$ 108A and the new version of the routing table is stored at request router 104B as routing table $V_1$ 108B. However, the respective logical clocks of request routers 104A and 104B continue to indicate the initial moment in logical time corresponding with routing table $V_0$. Thus, request routers 104A and 104B continue to route requests according to stored routing table $V_0$ 106A and stored routing table $V_0$ 106B.

For example, at event 4 another request is received from client 102B and is routed to service host 120B via request router 104B according to stored routing table $V_0$ 106B. The routed request indicates that the current moment in logical time from the perspective of request router 104B is the initial moment in logical time (e.g. the moment in logical time corresponding to routing table version $V_0$). Because this moment in logical time is not later than the latest moment in logical time maintained in the record of service host 120B, the service host continues to indicate in its record that the latest moment in logical time is the initial moment in logical time (e.g. the moment in logical time corresponding to routing table version $V_0$).

At event 5, a routing authority, such as routing authority 114, provides an indication to at least one of the request routers of the provider network to transition to the next moment in logical time. For example routing authority 114 provides indication 116 to request router 104A to transition its logical clock to the next moment in logical time, wherein the next moment in logical time corresponds to routing table version $V_1$. In response, the logical clock of request router 104A is changed to indicate the next moment in logical time (e.g. the moment in logical time corresponding to routing table version $V_1$) as the current moment in logical time from the perspective of request router 104A. However, at this point, the logical clock of request router 104B still indicates the previous moment in logical time (e.g. the moment in logical time corresponding to routing table version $V_0$) as the current moment in logical time from the perspective of request router 104B.

At event 6, a request is sent from client 102A to request router 104A. Because request router 104A has transitioned to the next moment in logical time as the current moment in logical time from the perspective of request router 104A, the request router routes the request according to the locally stored routing table $V_1$ 108A. The routed request indicates that the current moment in logical time from the perspective of request router 104A is the next moment in logical time (e.g. the moment in logical time corresponding to routing table version $V_1$). Because this is a later moment in logical time than the latest moment in logical time included in service host 120A's record, the service host updates its record to indicate the next moment in logical time (e.g. the moment in logical time corresponding to routing table version $V_1$) as the latest moment in logical time.

At event 7, a request is sent from client 102B to request router 104B. The request is directed to a service, data, etc. of the client that is stored or implemented at service host 120A. Thus, according to the locally stored routing table $V_0$ 106B, the request is routed to service host 120A. The routed request indicates that the current moment in logical time from the perspective of request router 104B is the initial moment in logical time (e.g. the moment in logical time corresponding to routing table version $V_0$). However, the record of service host 120A indicates that the next moment in logical time (e.g. the moment in logical time corresponding to routing table version $V_1$) is the latest moment in logical time. Thus, service host 120A rejects the request.

At event 8, service host 120A sends an indication to request router 104B that the request router is to transition to the next moment in logical time. In some embodiments, the indication may be the rejection of the request or may be a message indicating the latest moment in logical time or another form of indication. In response to receiving the indication to transition to the next moment in logical time, request router 104B transitions its logical clock to indicate the next moment in logical time as the current moment in logical time from the perspective of request router 104B. Thus, at this point both request router 104A and request router 104B indicate the next moment in logical time (e.g. the moment in logical time corresponding to routing table version $V_1$) as the current moment in logical time from the perspective of both of the request routers 104A and 104B.

At event 9, request router 104B re-sends the request rejected at event 7 according to the next version of the routing table, e.g. routing table version $V_1$ 108B that is stored locally at request router 104B. The routed request indicates that the current moment in logical time from the perspective of request router 104B is the next moment in logical time (e.g. the moment in logical time corresponding to routing table version $V_1$). Because the indicated current moment in logical time is not a preceding moment in logical time as compared to the latest moment in logical time recorded by service host 120A, the service host accepts the request and processes the request.

At event 10, client 102A sends a request to request router 104B (which has transitioned to the next moment in logical time). Request router 104B routes the request to service host 120B according to routing table version $V_1$ 108B. The routed request indicates that the current moment in logical time from the perspective of request router 104B is the next moment in logical time (e.g. the moment in logical time corresponding to routing table version $V_1$).

This sequence of events may be repeated until each request router has transitioned to the next moment in logical time. Also events 1-10 may be repeated for each subsequent version of the routing table generated by the routing authority.

Figure 2A:
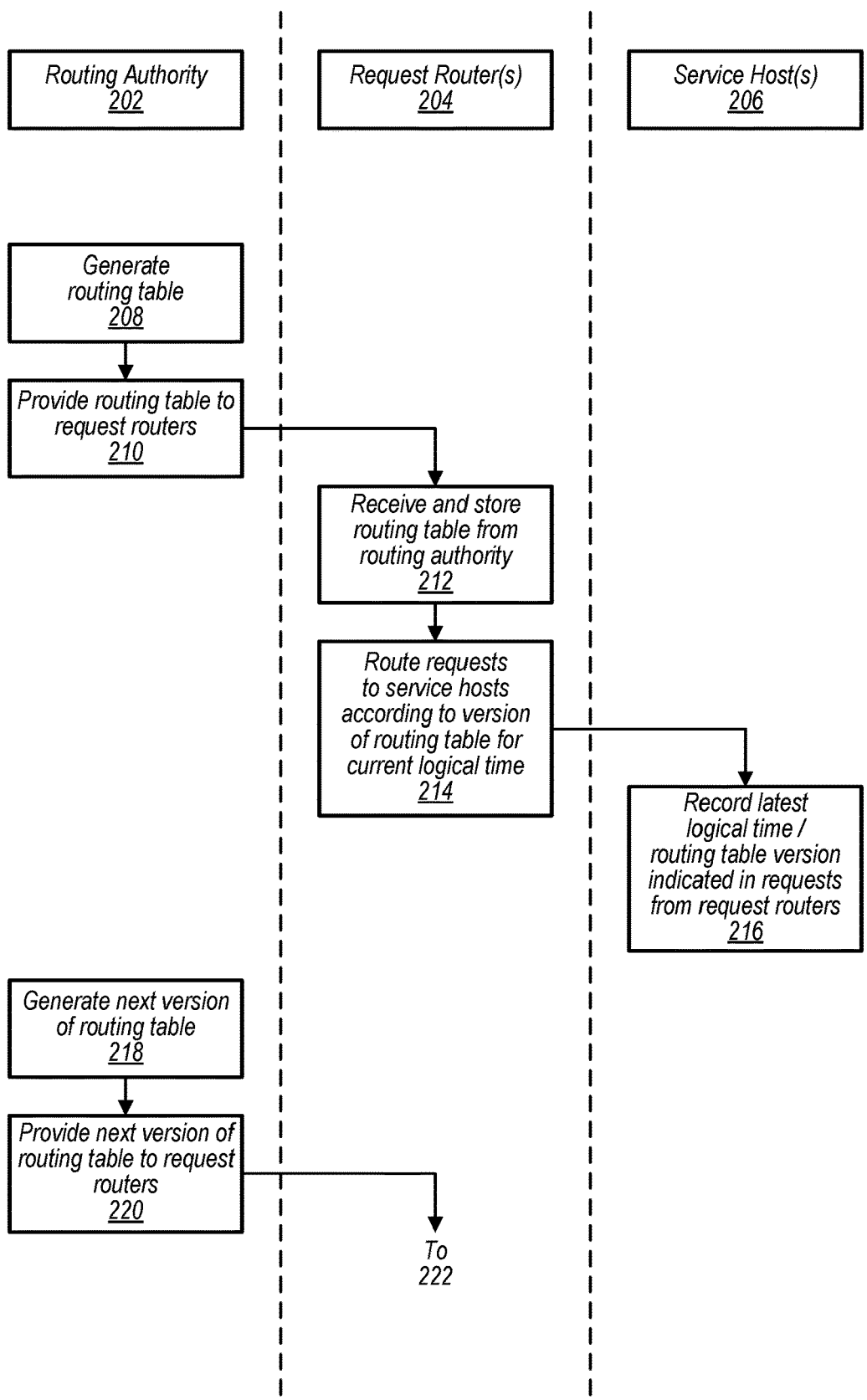
FIGS. 2A-C are multi-component flow-charts illustrating actions performed by a routing authority, respective ones of a set of request routers, and respective ones of a set of service hosts to achieve fault-tolerant request routing, according to some embodiments.
Figure 2B:
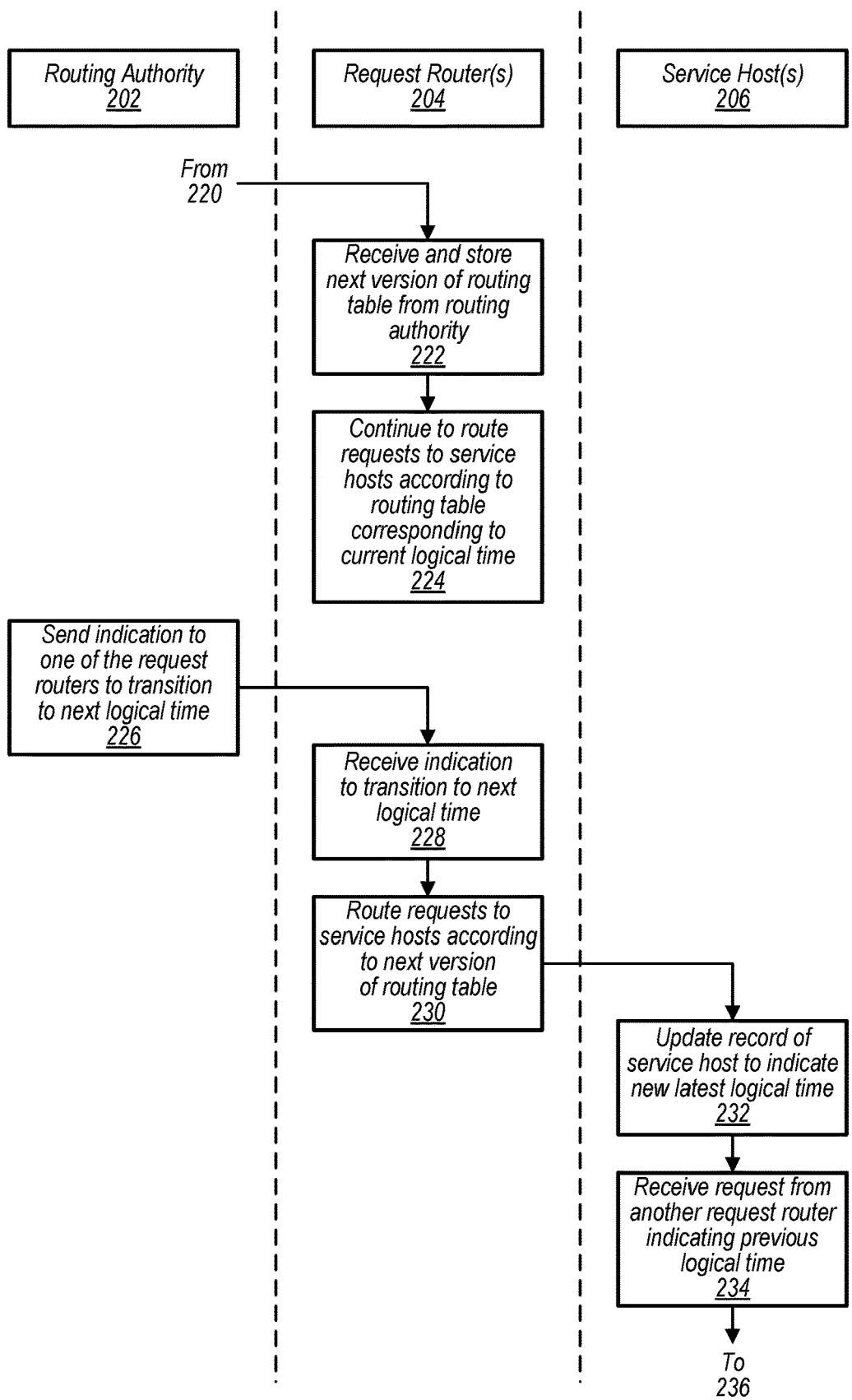
Figure 2C:
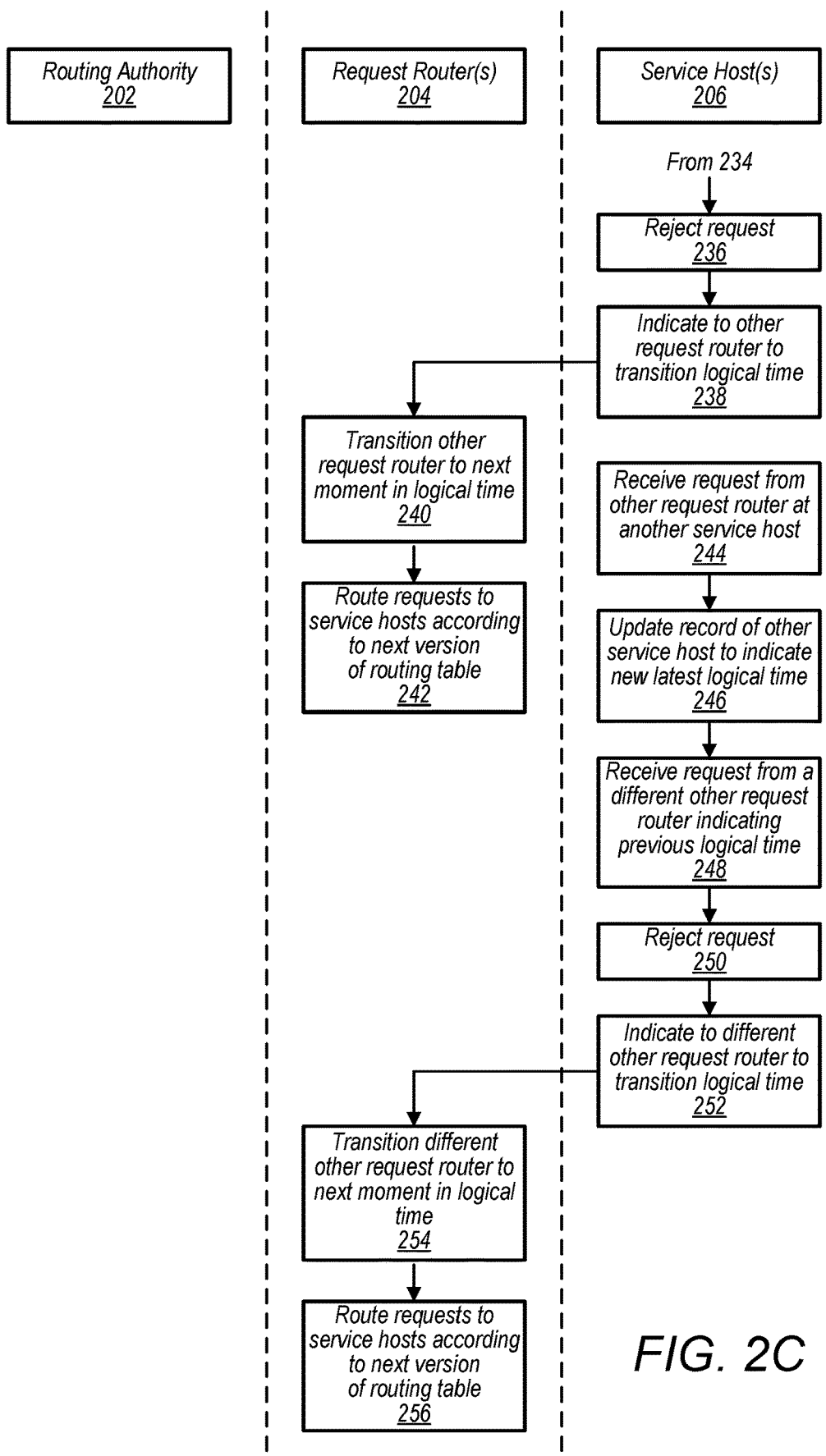

FIGS. 2A-C are multi-component flow-charts illustrating actions performed by a routing authority, respective ones of a set of request routers, and respective ones of a set of service hosts to achieve fault-tolerant request routing, according to some embodiments. The routing authority 202 shown in FIG. 2 may be a routing authority such as the routing authority 114 in FIG. 1. Also, the request routers 204 may be request routers such as request routers 104A/B in FIG. 1. Additionally, the service hosts 206 may be service hosts such as the service hosts 120A/B in FIG. 1.

At 208 the routing authority generates a routing table and at 210 the routing table is provided to request routers of the provider network. In some embodiments, the routing authority may direct distribution of the routing table. In other embodiments, a routing authority may provide the routing table to request routers when directed to provide the routing table, for example in response to a request from a request router for the routing table or a next version of the routing table.

At 212, respective ones of the request routers receive and locally store the routing table received from the routing authority.

At 214, the request routers route requests according to the locally stored routing table and indicate in the requests the current moment in logical time from the perspective of each of the request routers.

At 216, each of the service host to which a request is routed records the latest moment in logical time indicated in any of the requests received by the respective service host. In some embodiments, each of the service hosts receives requests from more than one request router and each request router routes requests to more than one service host.

At 218, the routing authority generates a next version of the routing table corresponding to a next moment in logical time. At 220 the next version of the routing table is provided to each of the request routers of the provider network or a region of the provider network. In some embodiments the next version of the routing table may be provided to the request routers in a staggered manner to prevent overloading of the routing authority and to reduce overhead load on a network of the provider network. For example, the next version of the routing table may not be provided to all of the request routers at the same moment in time, but instead the next version of the routing table may be distributed within a time range.

At 222 the request routers receive and store the next version of the routing table. However, because the current time of the respective request routers does not yet indicate the next moment in logical time, the request routers continue to route packets according to the previous version of the routing table corresponding to the previous moment in logical time. This allows variances in when the request routers receive the next version of the routing table to not impact routing consistency. In some embodiments, the request routers may further perform one or more tests on the received next version of the routing table before using the routing table to route packets. For example, the request routers may check the received next version of the routing table for corruption and may indicate to the routing authority that the request router has received a corrupt next version of the routing table. In such circumstances, the routing authority may delay a transition to the next moment in logical time until the corrupt version of the routing table received at the request router is replaced with a non-corrupt next version of the routing table.

At 224, the request routers continue to route packets according to the preceding version of the routing table that corresponds with the current moment in logical time from the perspective of the request routers.

At 226, the routing authority sends an indication to a selected one of the request routers (or in the case of request routing being implemented by a client, a selected one of the clients). Note that in embodiments wherein request routing is implemented at the clients, the routing table and next version of the routing table may be provided to the clients as described in 212 and 222.

At 228, the selected request router (or client) receives the indication to transition to the next moment in logical time and transitions the logical clock of the request router (or client) to the next moment in logical time. At 230 the transitioned request router (or client) routes subsequent requests to the service hosts according to the next version of the routing table received at 222. Also, the transitioned request router indicates in the subsequently routed requests the current moment in logical time from the perspective of the transitioned request router is the next moment in logical time.

At 232 a service host receives a request from the transitioned request router that indicates the next moment in logical time as the current moment in logical time from the perspective of the transitioned request router. In response, the service host updates the record of the service host to indicate the next moment in logical time as the latest moment in logical time. At 234 the service host that has now recorded the next moment in logical time as the latest moment in logical time receives a request from another request router that has not yet transitioned its logical clock to the next moment in logical time. At 236, the service host rejects the request because it indicates a moment in logical time that precedes the latest moment in logical time and at 238 the service host indicates to the request router to transition to the next moment in logical time.

At 240 the request router that had not yet transitioned transitions to the next moment in logical time in response to receiving the indication from the service host sent at 238. At 242 the transitioned request router routes requests to service host according to a routing table corresponding to the next moment in logical time that is now the current moment in logical time from the perspective of the request router.

At 244 another service host receives a request from the other request router that was transitioned at 240. The request indicates the next moment in logical time as the current moment in logical time from the perspective of the other request router. In a similar manner as at 232, the other service host, at 246, updates a record maintained by the service host to indicate the next moment in logical time as the latest moment in logical time. At 248 the other service hosts receives requests from different other request routers indicating the previous moment in logical time as the current moment in logical time from the perspective of the other request routers. At 250 the other service host rejects the requests and at 252 sends indications to the request routers to transition to the next moment in logical time.

At 254 the different other request routers transition to the next moment in logical time and at 256 the different other request routers route subsequent requests according to the routing table corresponding to the next moment in logical time, which is now the current moment in logical time from the perspective of the other different request routers.

In some embodiments, a fault-tolerant request routing system, as described herein, may hide divisions within a provider network from clients of the provider network. For example, in some embodiments, a provider network may comprise multiple resource cells each comprising a set of service hosts. The provider network may also include one or more request routers that route requests to the service hosts in the resource cells. For example, in some embodiments, a resource cell may be a small-scale data center, wherein a traditional larger scale data center is divided into autonomous smaller scale resource cells. However, the organization of the resource cells may be hidden from clients. Also the addition of resource cells to a region may not be visible to clients. This is because the clients interact with a routing authority that is continuously updated via new versions of a routing table to account for changes in the organization of the resource cells, addition of more resource cells, or a failure of one or more resource cells. Additionally, a provider network may be organized into regions wherein each region comprises a set of resource cells and a routing authority that manages routing tables for routing requests to service hosts in the resource cells of that region of the provider network.

Figure 3:
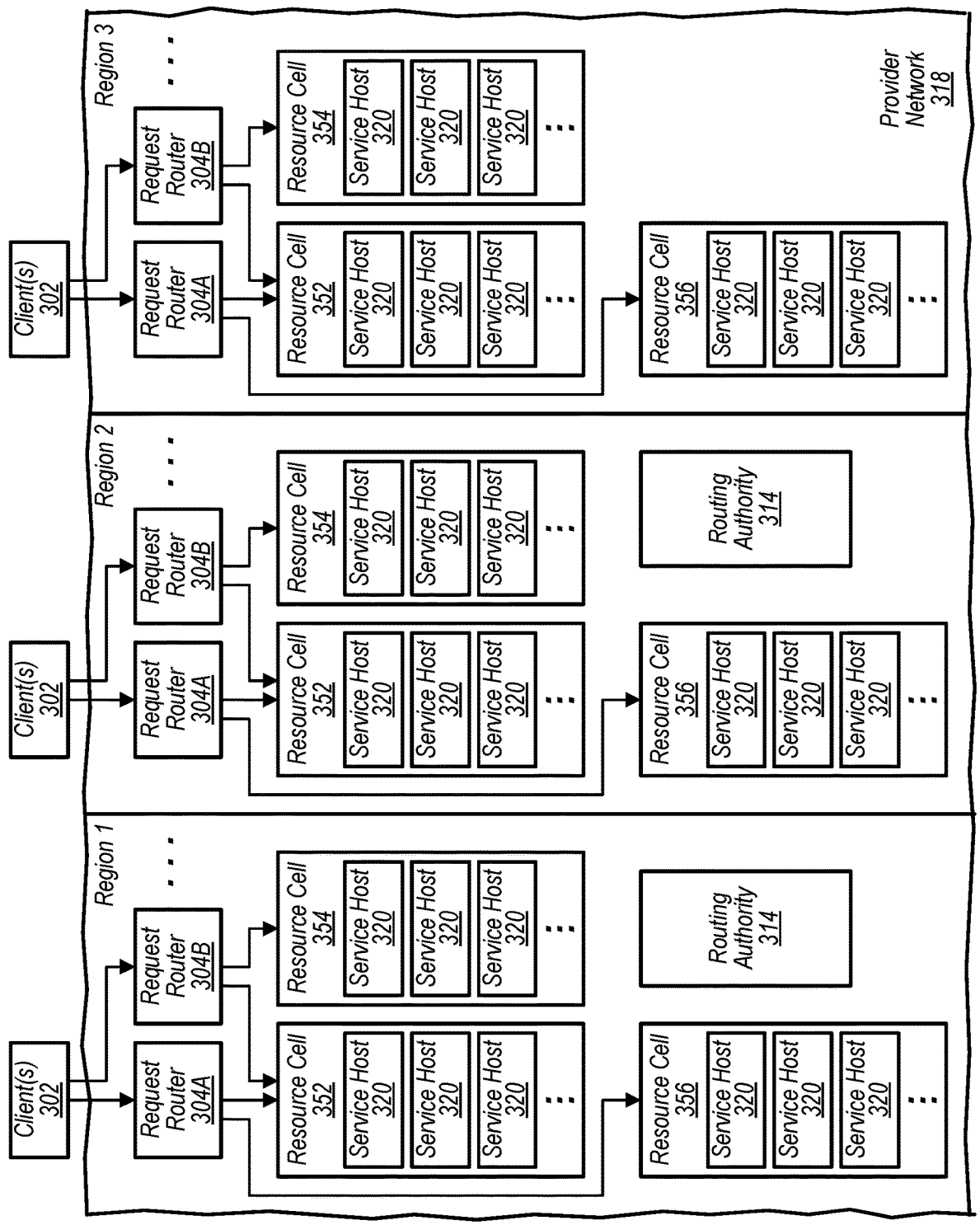
FIG. 3 is a block diagram illustrating a provider network comprising a plurality of regions, wherein the regions comprise request routers and service hosts organized into a plurality of resource cells, according to some embodiments.

FIG. 3 is a block diagram illustrating a provider network comprising a plurality of regions, wherein the regions comprise request routers and service hosts organized into a plurality of resource cells, according to some embodiments.

Provider network 318 may be a similar provider network as provider network 118 illustrated in FIG. 1. Provider network 318 includes regions 1, 2, and 3. Provider network may also include additional regions. Each region includes a routing authority 314 similar to routing authority 114 described in regard to FIG. 1. Each region also includes request routers 304A and 304B similar to request routers 104A and 104B described in regard to FIG. 1. Clients, such as clients 302 may send request to respective ones of the request routers 304. Additionally, each region comprises resource cells 352, 354, and 356. In some embodiments, a region may include more or less resource cells as shown in FIG. 3. Also resource cells may be added to a region or taken away from a region based on demand for services in that region. Each of the resource cells include service hosts 320 similar to service hosts 120 described in regard to FIG. 1.

In some embodiments, a routing authority, such as the routing authority 314 for region 2, may provide fault-tolerant request routing support for more than one region of the provider network. For example, region 3 does not include a routing authority, and the routing authority 314 of region 2 may support both region 2 and region 3. In some embodiments, a routing authority of a provider network may provide fault-tolerant routing support to any number of regions of the provider network and/or any number of resource cells of the provider network.

In some embodiments, request routing functionality as described in regard to request routers 104 in regard to FIG. 1 may be implemented on client devices and the client devices may route request to service hosts without intermediate request routers, such as request routers 104.

Figure 4:
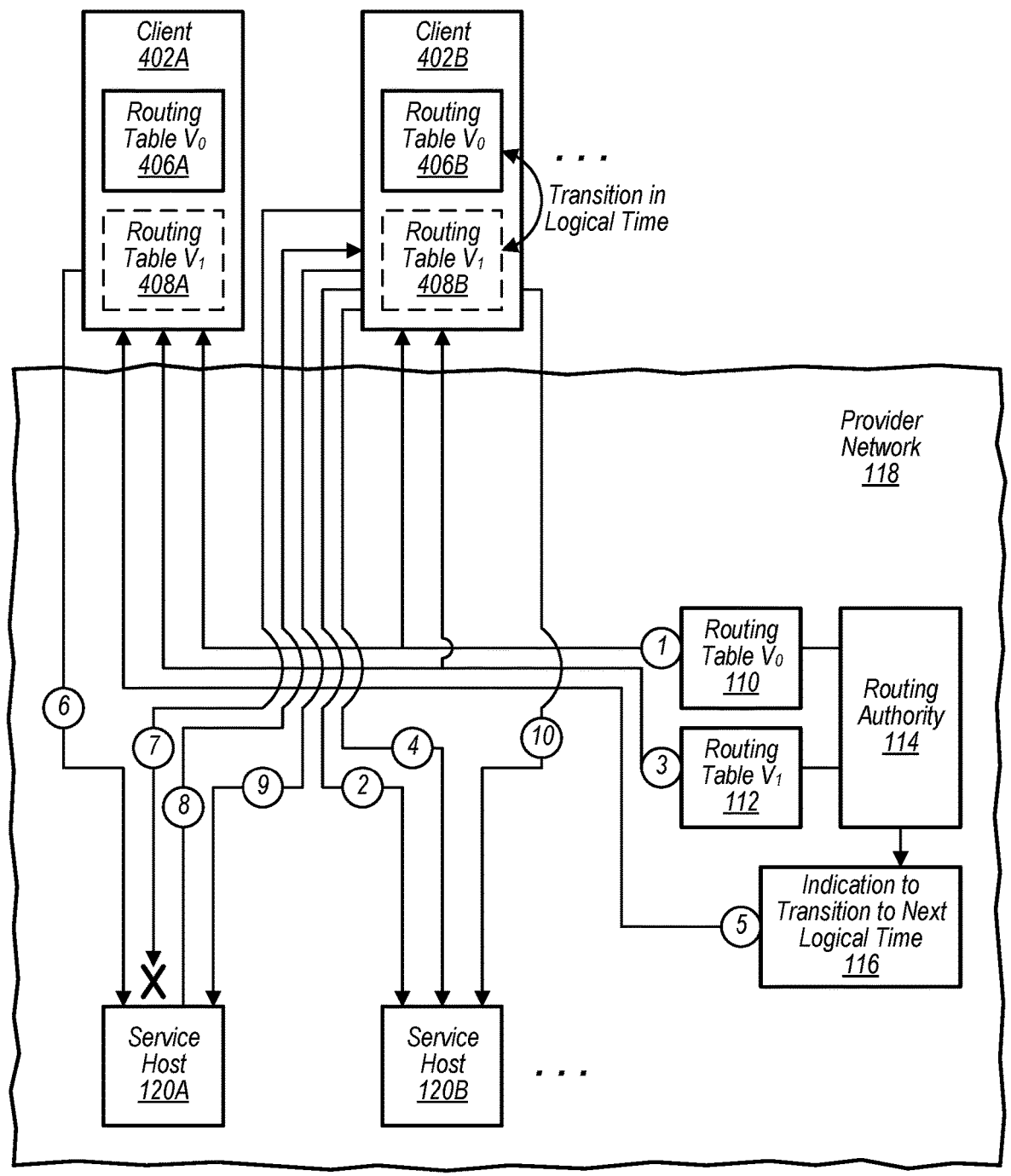
FIG. 4 is a block diagram illustrating a fault-tolerant request routing system, wherein at least some of the request routing is performed on client devices, according to some embodiments.

For example, FIG. 4 is a block diagram illustrating a fault-tolerant request routing system, wherein at least some of the request routing is performed on client devices, according to some embodiments. In FIG. 4, client devices 402A and 402B locally store routing table $V_0$ 406A and 406B respectively, which may be similar routing tables to routing table $V_0$ 106A and 106B described in regard to FIG. 1, respectively. A routing authority, such as routing authority 114, may provide the initial version of the routing table, such as routing table $V_0$ 110, to the client devices and may also provide a next version of the routing table, such as routing table $V_1$ 112 to the client devices. The client devices, such as client devices 402A and 402B, may store the initial version of the routing table as routing table $V_0$ 406A and 406B, respectively, and may store the next version of the routing table as routing table $V_1$ 408A and 408B, respectively. Also a routing authority, such as routing authority 114, may send an indication to transition to the next moment in logical time, such as indication 116, to one of the client devices, such as client device 402A. The client devices may transition their respective logical clocks in response to receiving an indication from the routing authority or one of service hosts in a similar manner as described for the request routers 104 illustrated in FIG. 1.

In some embodiments, a routing authority may provide a version of a routing table to one or more of the request routers and the request routers may distribute the routing table version to one another peer-to-peer. For example, in some embodiments each request router may not request the next version of the routing table from the routing authority, but may instead receive the next version of the routing table from a peer request router that has already received the next version of the routing table. As described above, the distribution of the next version of the routing table may take place prior to a transition in logical time that causes the next version of the routing table to be used to route requests.

Figure 5:
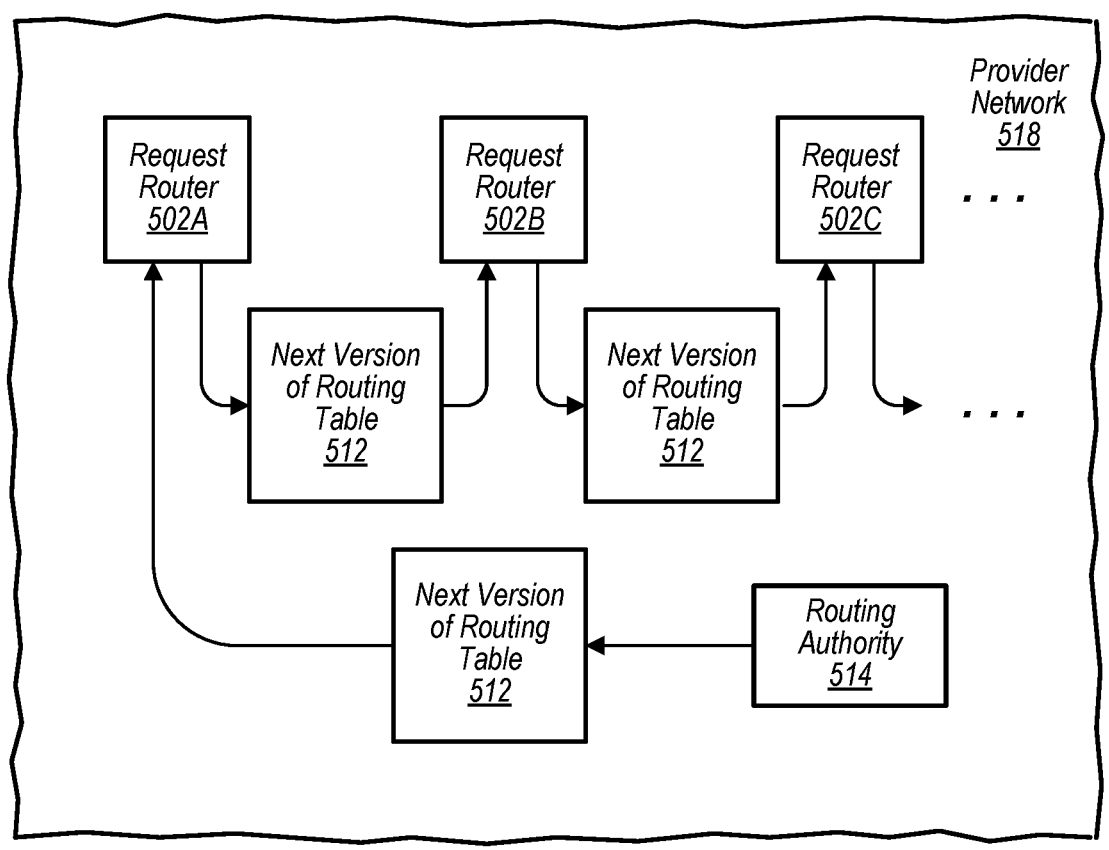
FIG. 5 is a high-level block diagram illustrating some embodiments in which request routers distribute updated routing table versions peer-to-peer.

FIG. 5 is a high-level block diagram illustrating some embodiments in which request routers distribute updated routing table versions peer-to-peer. For example, routing authority 514 provides next version of routing table 512 to request router 502A, which in turn provides next version of routing table 512 to request router 502B, which provides it to request router 502C, etc. In some embodiments, providing a next version of a routing table to request routers peer-to-peer may reduce an overhead load associated with distributing a next version of a routing table.

FIGS. 6A-6C illustrate simplified example routing tables used in a fault-tolerant request routing system, according to some embodiments. For example, routing table 602 includes information indicating which resource cells (and/or service hosts) include data or services allocated to respective clients A, B, or C. In such an embodiment, a request router may receive a request from a particular one of clients A, B, or C and route the request to the appropriate corresponding resource cell associated with the respective client. In some embodiments, a routing table, such as routing table 604, may include information indicting different services, such as a database service, key-based storage service, compute service, etc. and may include information indicating corresponding resource cells (and/or service hosts) where those services are implemented. In such an embodiment, a request router may receive a request directed to a particular one of the services and route the request to the appropriate corresponding resource cell associated with the respective service. In some embodiments, a routing table, such as routing table 606, may include key values associated with data stored for a client and corresponding resource cells (and/or service hosts) where data corresponding to those keys is stored. In such an embodiment, a request router may receive a request directed to a particular key or range of key values and route the request to the appropriate corresponding resource cell associated with the respective key or range of key values. Note that FIGS. 6A-6C illustrate example organizational schemes for a routing table of a request router. However, in some embodiments various other routing table organizations may be used to route request to service hosts.

In some embodiments, key-based routing table may be organized by string pre-fixes, wherein certain string-prefixes for keys are associated with corresponding resource cells (and/or service hosts) where data corresponding to keys having those sting pre-fixes are stored. For example a pre-fix tree may be implemented for a key, wherein the pre-fix trees indicate an order for the keys. However, the pre-fix tree may not include integers with integer ranges as shown in the example key-based routing table illustrated in FIG. 6C.

Figure 7:
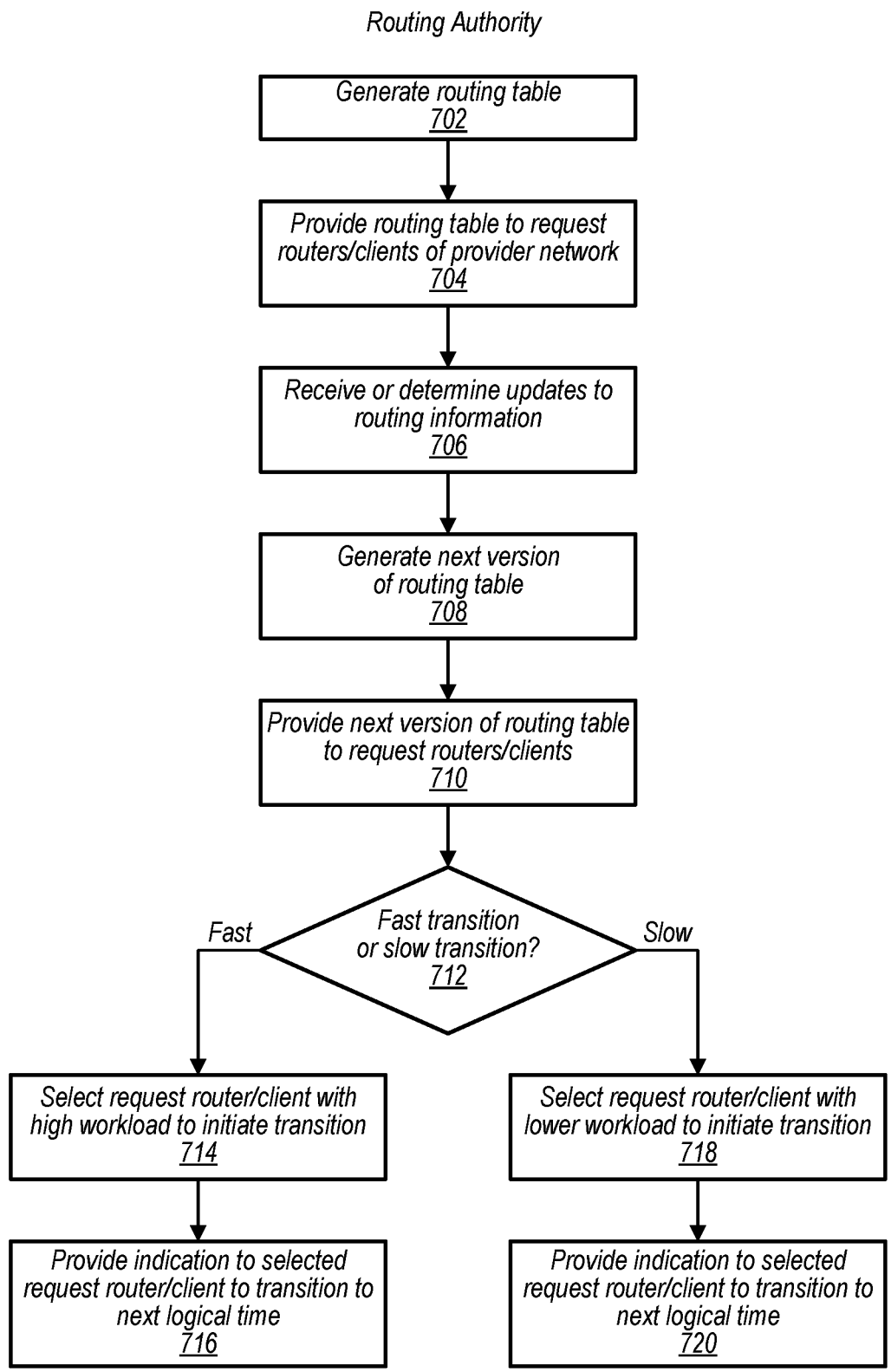
FIG. 7 is a high-level flowchart illustrating operations performed by a routing authority of a fault-tolerant request routing system, according to some embodiments.

FIG. 7 is a high-level flowchart illustrating operations performed by a routing authority of a fault-tolerant request routing system, according to some embodiments.

At 702, the routing authority generates a routing table and at 704 the routing authority provides the generated routing table to request routers or in some embodiments directly to clients. For example, in some embodiments, the routing authority may be part of a fault-tolerant routing service that manages routing for clients.

At 706, the routing authority receives or determines updates to the routing information. For example, additional resource cells may have been added to a region. Client demand may have changed necessitating load balancing, a resource cell may have failed or a service host may have failed necessitating a re-distribution to other resource cells or service hosts, etc. At 708 the routing authority generates a next version of the routing table based on the received or determined changes from 706.

At 710 the routing authority provides the next version of the routing table to the request routers, while the request routers continue to route packets according to a previous version of the routing table.

At 712, the routing authority determines if a fast transition or a slow transition to the next moment in logical time is to be performed. If a fast transition is to be performed, at 714 the routing authority provides an indication to a highly loaded request router to transition to the next moment in logical time. Because the request router is highly loaded it is more likely that it will quickly interact with multiple service hosts thus quickly spreading the transition to the next moment in logical time. For example, at 716, the routing authority provides the indication to transition to the next moment in logical time to the highly loaded selected request router. If a slower transition to the next moment in logical time is to be performed, the routing authority selects a less loaded request router at 718 and provides an indication to transition to the next moment in logical time to the selected less loaded request router at 720.

In some embodiments, a routing authority may be configured to perform a slower transition in order to more efficiently populate a cache included in the service hosts. For example a slow transition may be selected at 712. For example, some service hosts may include a cache for data or tasks requested to be performed by the service host. In some situations data or tasks being stored or performed by a first service host may be moved to a second service host in response to implementing a next version of a routing table. If multiple tasks or pieces of data being routed to the first service host from multiple request routers are transitioned to the second service host in a short amount of time, the cache of the second service host may be overwhelmed, and/or a large portion of the request directed to the second request router may be directed to data not stored in the cache. Thus the second service host may have slower response times until some data is built up in the cache for the new data or tasks the second service host is now hosting. A slow transition to a next version of a routing table may make it such that one of the multiple request routers starts to transition from the second service host while other ones of the request routers have not yet transitioned to the next version of the routing table. Thus, the cache of the service host may be allowed to adjust to the changed routing in a gradual manner. In other embodiments, a clean or sharp transition may be desired for routing information consistency and a fast transition may be selected at 712.

Figures 8, 9:
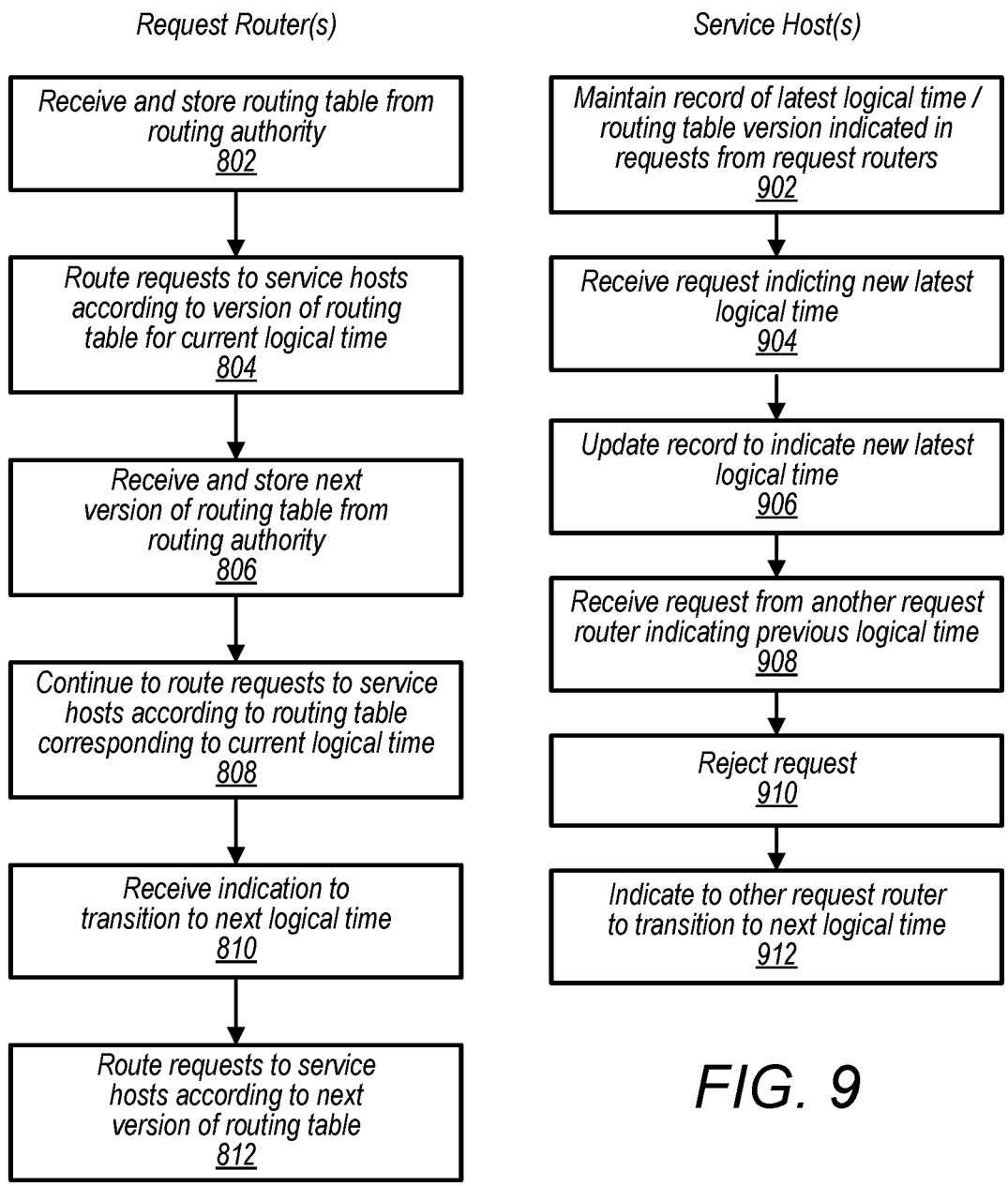
FIG. 8 is a high-level flowchart illustrating operations performed by a request router or a client device of a fault-tolerant request routing system, according to some embodiments.
FIG. 9 is a high-level flowchart illustrating operations performed by a service host of a fault-tolerant request routing system, according to some embodiments.

FIG. 8 is a high-level flowchart illustrating operations performed by a request router or a client device of a fault-tolerant request routing system, according to some embodiments.

At 802, a request router receives and stores a routing table from a routing authority. At 804, the request router routes requests to service hosts according to the stored routing table. At 806 the request router receives a next version of the routing table corresponding to a next moment in logical time, but at 808 the request router continues to route requests according to the previous version of the routing table that corresponds to the current moment in logical time from the perspective of the request router.

At 810, the request router receives an indication to transition a logical clock of the request router to a next moment in logical time that corresponds to the next version of the routing table. The indication may be received from the routing authority or from a service host with which the request router interacts. At 812, in response to transitioning the logical clock of the request router to the next moment in logical time, the request router begins to route requests to the service hosts according to the next version of the routing table that now corresponds to the current logical time from the perspective of the request router.

FIG. 9 is a high-level flowchart illustrating operations performed by a service host of a fault-tolerant request routing system, according to some embodiments.

At 902 a service host maintains a record of a latest logical time that has been indicated in any request received from any of the request routers (or clients) with which the service hosts interacts. At 904, the service host receives a request indicating a logical time that is later in logical time than the latest logical time included in the record maintained by the service host. At 906, the service host updates the record to indicate the new latest moment in logical time as the latest moment in logical time that has been indicated in a request received by the service host. At 908 the service host receives a request from a request router indicating a moment in logical time that comes before the latest moment in logical time in the record maintained by the service host. In response the service host rejects the request at 910 and at 912 indicates to the other request router to transition to the next moment in logical time.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various request routers, service hosts, routing authority and other components that implement the distributed systems described herein). The various methods as illustrated in the figures and described herein represent example embodiments of methods. The order of any method may be changed, and various elements may be added, reordered, combined, omitted, modified, etc.

Figure 10:
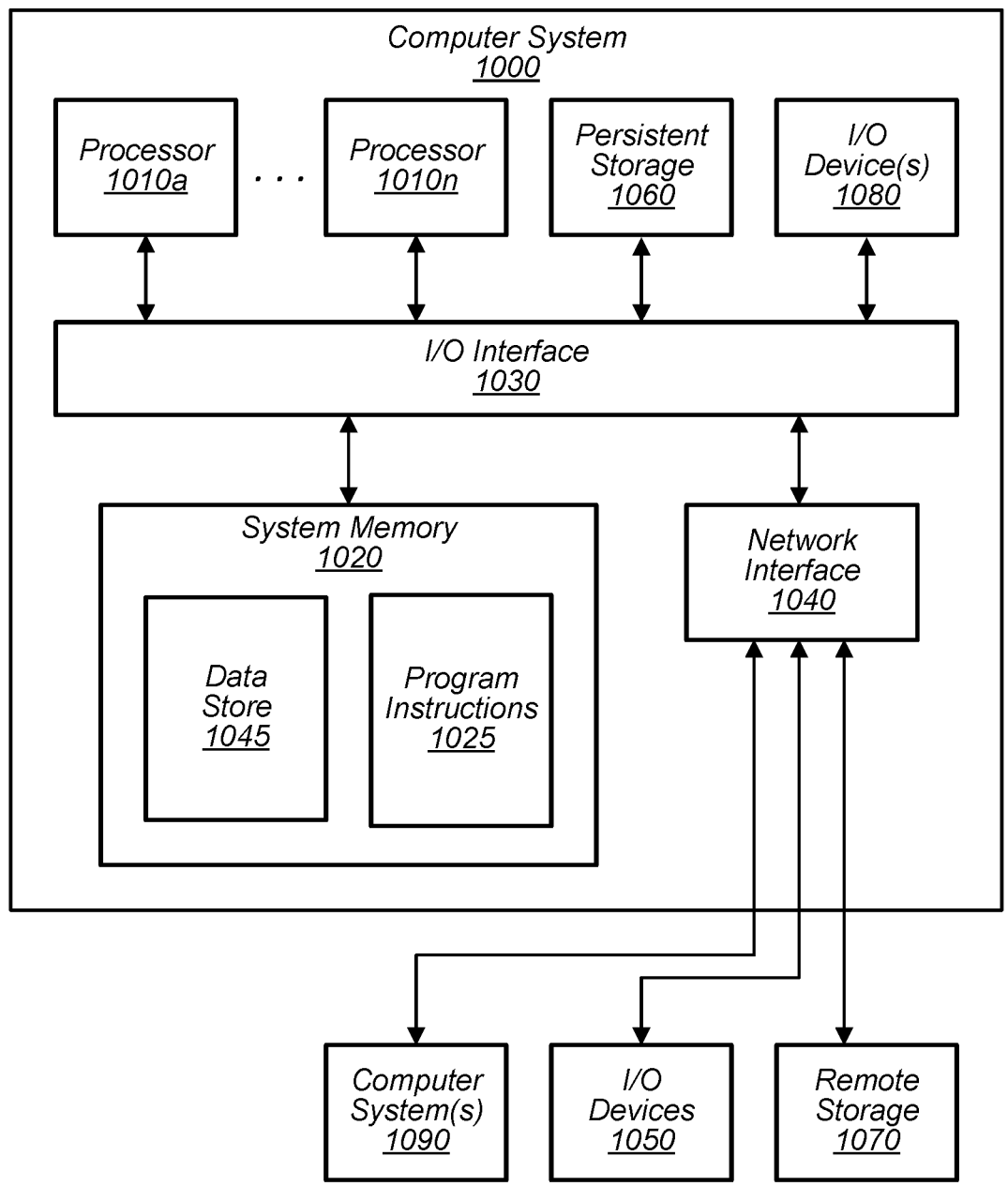
FIG. 10 is an example computer system, according to various embodiments.

FIG. 10 is a block diagram illustrating a computer system configured to implement at least a portion of the various nodes, systems, or components of the distributed systems, such as the request routers, service hosts, routing authority described herein, according to various embodiments. For example, computer system 1000 may be configured to implement various nodes of a distributed system that stores data on behalf of clients, in different embodiments, or more generally implement any of the various types of nodes or components that may be implemented as part of a distributed system. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a distributed system node or client of a distributed system. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the system described herein may be stored in data store 1045 or in another portion of system memory 1020 on one or more nodes, in persistent storage 1060, and/or on one or more remote storage devices 1070, at different times and in various embodiments. Similarly, the information described herein as being stored by the system may be stored in another portion of system memory 1020 on one or more nodes, in persistent storage 1060, and/or on one or more remote storage devices 1070, at different times and in various embodiments. In general, system memory 1020

(e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more request routers, service hosts, routing authority), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the fault-tolerant routing embodiments described herein, or any of their components, may be implemented as one or more network-based services. For example, the fault-tolerant request routing systems described herein may be offered to clients as a network-based service. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A provider network comprising:
   a plurality of request routers each configured to receive request packets from clients of the provider network;
   a plurality of service hosts each configured to process request packets from clients of the provider network; and
   a routing authority configured to generate, for each of a plurality of moments in logical time, a corresponding routing table comprising routing instructions for routing packets between respective ones the request routers and respective ones of the service hosts;
   wherein respective ones of the request routers are further configured to:
      route respective packets received at the respective request router to respective ones of two or more of the service hosts, according to a current version of the routing table corresponding to a current moment in logical time from the perspective of the request router and
      indicate in the respective routed packets the current moment in logical time from the perspective of the request router;

receive from the routing authority another version of the routing table corresponding to a next moment in logical time;

continue to route additional respective request packets to respective ones of the two or more of the service hosts, according to the version of the routing table for the current moment in time from the perspective of the request router;

receive an indication to transition the request router to the next moment in logical time; and in response to receiving the indication, route subsequently received packets according to the other version of the routing table, wherein the packets routed according to the other version of the routing table indicate the next moment in logical time as the current moment in logical time from the perspective of the request router, wherein each of the service hosts is configured to:
maintain a record of a latest moment in logical time indicated in a packet received from any of the request routers; and in response to receiving a packet from one of the request routers that indicates a moment in logical time previous to the latest moment in logical time in the record maintained by the service host, send a response to the one of the request routers comprising an indication to transition to the next moment in logical time.

2. The provider network of claim 1,
wherein each of the request routers are further configured to:
store a current version of the routing table corresponding to the current moment in logical time; and
route packets to the respective ones of the two or more service hosts according to the stored current version of the routing table without consulting the routing authority in order to route the packets to the respective ones of the two or more service hosts.

3. The provider network of claim 1, wherein the provider network comprises a plurality of resource cells each comprising a plurality of the service hosts, and
wherein each of the request routers is configured to:
route packets to service hosts located in two or more of the resource cells of the provider network according to a current version of the routing table corresponding to the current moment in logical time.

4. The provider network of claim 3,
wherein the provider network comprises two or more regions,
wherein each region comprises:
a plurality of the resource cells of the provider network, each comprising a plurality of the service hosts; and
one or more request routers configured to route packets to the service hosts located in two or more of the resource cells, of the region in which the one or more request routers are located, according to a current version of the routing table corresponding to the current moment in logical time.

5. The provider network of claim 1,
wherein the routing authority is further configured to:
select one of the request routers of the plurality of requests routers as a request router to initiate a transition to the next moment in logical time; and
send an indication to transition to the next moment in logical time to the request router selected to initiate the transition to the next moment in logical time.

6. A method comprising:
routing respective packets to respective ones of two or more service hosts of a provider network, according to a locally stored current version of a routing table corresponding to a current moment in logical time,
wherein the respective routed packets indicate a first moment in logical time as the current moment in logical time;
receiving from a routing authority of the provider network another version of the routing table corresponding to a next moment in logical time;
continuing to route additional respective packets to respective ones of the two or more service hosts, according to the version of the routing table corresponding to the first moment in logical time;
receiving an indication from one of the two or more service hosts to transition to the next moment in logical time; and
in response to receiving the indication, routing subsequent packets according to the other version of the routing table,
wherein the subsequent packets routed according to the other version of the routing table indicate the next moment in logical time as the current moment in logical time.

7. The method of claim 6, wherein
said routing packets according to the current version of the routing table,
said receiving another version of the routing table,
said continuing to route additional packets according to the current version of the routing table,
said receiving the indication to transition to the next moment in logical time, and
said routing subsequent packets according to the other version of the routing table
are performed by a request router of the provider network.

8. The method of claim 6, wherein
said routing received packets according to the current version of the routing table,
said receiving another version of the routing table,
said continuing to route additional packets according to the current version of the routing table,
said receiving the indication to transition to the next moment in logical time, and
said routing subsequent packets according to the other version of the routing table
are performed by a client device of a client of the provider network,
wherein the client device is external to the provider network.

9. The method of claim 6, wherein
said routing packets according to the current version of the routing table,
said continuing to route additional packets according to the current version of the routing table, and
said routing subsequent packets according to the other version of the routing table
are performed without consulting the routing authority to route each of the packets, additional packets, or subsequent packets to the respective ones of two or more service hosts.

10. The method of claim 6, further comprising;
receiving, at another service host of the provider network, one of the subsequent packets indicating the next moment in logical time,
wherein the one of the subsequent packets is routed to the other service host from a first device;

updating a record maintained by the other service host to indicate the next moment in logical time as a latest moment in logical time indicated in a packet received by the other service host;

receiving, at the service host, another packet indicating a moment in logical time prior to the latest moment in logical time included in the record maintained by service host, wherein the other packet is routed to the service from another device;

rejecting the packet from the other device; and providing to the other device an indication to transition to the next moment in logical time.

11. The method of claim 10, wherein said receiving the indication to transition from the current moment in logical time to the next moment in logical time is received after each of a plurality of request routers of the provider network have received the other version of the routing table corresponding to the next moment in logical time.

12. The method of claim 6, wherein the indication to transition to the next moment in logical time is receive at first request router of the provider network, the method further comprising:

receiving, at one or more additional request routers of the provider network, an indication to transition to the next moment in logical time, wherein at least some of the request routers of the provider network receive the indication to transition the at least some request routers to the next moment in logical time before or after other ones of the request routers.

13. The method of claim 6, further comprising:

selecting, by the routing authority of the provider network, one of a plurality of request routers of the provider network as a request router to initiate a transition to the next moment in logical time; and sending an indication to transition to the next moment in logical time to the request router selected to initiate the transition to the next moment in logical time.

14. The method of claim 13, wherein the request router selected to transition to the next moment in logical time is selected based, at least in part, on a workload of the selected request router relative to other ones of the request routers of the provider network.

15. The method of claim 6, wherein the routing authority is part of a routing service of the provider network, and wherein the other version of the routing table corresponding to the next moment in logical time and the indication to transition to the next moment in logical time are provided to clients of the routing service as part of the routing service.

16. A non-transitory computer-readable medium storing program instructions, that when executed by one or more processors, cause the one or more processors to:

route respective packets to respective ones of two or more service hosts of a provider network, according to a current version of a routing table corresponding to a current moment in logical time, wherein the respective routed packets indicate a first moment in logical time as the current moment in logical time;

receive from a routing authority of the provider network another version of the routing table corresponding to a next moment in logical time;

continue to route additional respective request packets to respective ones of the two or more service hosts, according to the version of the routing table corresponding to the current moment in logical time;

receive an indication from one of the two or more service hosts to transition to the next moment in logical time; and in response to receiving the indication, route subsequent packets according to the other version of the routing table, wherein the packets routed according to the other version of the routing table indicate the next moment in logical time as the current moment in logical time.

17. The non-transitory computer-readable medium of claim 16, wherein the program instructions, when executed by the one or more processors, cause the one or more processors to perform:

said route packets according to the current version of the routing table, said continue to route additional packets according to the current version of the routing table, and said route subsequent packets according to the other version of the routing table, without consulting the routing authority to route each of the packets, additional packets, or subsequent packets.

18. The non-transitory computer-readable medium of claim 16, wherein the program instructions, when executed by the one or more processors, cause the one or more processors to perform:

receiving from the routing authority of the provider network a new version of the routing table corresponding to a new moment in logical time; and receiving a new indication from the routing authority to transition to the new moment in logical time.

19. The non-transitory computer-readable medium of claim 16, wherein the indication to transition to the next moment in logical time is received from the service host of the provider network in response to routing one of the additional respective packets to the service host.

20. The non-transitory computer-readable medium of claim 16, wherein the program instructions when executed by the one or more processors, cause the one or more processors to:

distribute the routing table corresponding to the next moment in logical time to one or more peer request routers of the provider network prior to transitioning to the next moment in logical time.

* * * * *